US007639114B2

(12) United States Patent
Yu

(10) Patent No.: US 7,639,114 B2
(45) Date of Patent: Dec. 29, 2009

(54) TEMPERATURE FUSE PROTECTION DEVICE

(76) Inventor: Tsung-Mou Yu, No. 4, Alley 2, Lane 23, Sec. 3, Pa Te Road, Panchiao, Taipei Hsien (TW)

( * ) Notice: Subject to any disclaimer, the term of this patent is extended or adjusted under 35 U.S.C. 154(b) by 209 days.

(21) Appl. No.: 11/562,904

(22) Filed: Nov. 22, 2006

(65) Prior Publication Data

US 2008/0117016 A1 May 22, 2008

(51) Int. Cl.
*H01H 37/76* (2006.01)
*H01H 85/00* (2006.01)
*H02H 5/04* (2006.01)
*H01H 63/00* (2006.01)

(52) U.S. Cl. ....................... 337/405; 337/403; 337/401; 337/142; 337/4; 361/104; 29/623

(58) Field of Classification Search ................. 337/401, 337/403, 405, 4, 142; 361/104; 29/623
See application file for complete search history.

(56) References Cited

U.S. PATENT DOCUMENTS 1,438,609 A * 12/1922 Perkins ....................... 337/239
1,669,157 A * 5/1928 Brown ........................ 337/293
2,300,142 A * 10/1942 Wood ......................... 337/164
2,796,494 A * 6/1957 Barnes ....................... 337/416
2,921,167 A * 1/1960 Dahlen ....................... 337/181
3,198,914 A * 8/1965 Baran et al. ................. 337/405
3,613,040 A * 10/1971 Fluder et al. ................ 337/282
3,629,766 A * 12/1971 Gould, Jr. ................... 337/239
3,639,874 A * 2/1972 Deelman ...................... 337/185
3,796,981 A * 3/1974 Poitras ....................... 337/239
4,124,835 A * 11/1978 Cahill, Jr. .................. 337/1
4,204,183 A * 5/1980 Blewitt ....................... 337/295
4,307,370 A * 12/1981 Hollweck ..................... 337/299
4,488,137 A * 12/1984 Rooney et al. ................ 337/162
4,652,848 A * 3/1987 Hundrieser ................... 337/297
4,929,922 A * 5/1990 Hollweck ..................... 337/407
5,600,295 A * 2/1997 Kaufmann ..................... 337/405
5,708,553 A * 1/1998 Hung ......................... 361/103
5,896,080 A * 4/1999 Chen ......................... 337/407
6,198,376 B1 * 3/2001 Ishikawa et al. .............. 337/297
6,342,826 B1 * 1/2002 Quinn et al. ................. 337/300
6,348,851 B1 * 2/2002 Wyser et al. ................. 337/411
6,741,159 B1 * 5/2004 Kuczynski .................... 337/403
6,894,241 B1 * 5/2005 Yu ........................... 200/553

FOREIGN PATENT DOCUMENTS

JP 2006059568 A * 3/2006

* cited by examiner

*Primary Examiner*—Jayprakash N Gandhi
*Assistant Examiner*—Bradley H Thomas
(74) *Attorney, Agent, or Firm*—WPAT, P.C.; Anthony King

(57) ABSTRACT

A temperature fuse protection device uses a hot melt metal to rivet for connecting two terminals in the circuit that are separated for making the two terminals electrically-connected and the circuit complete. There is a spacing in between the two free ends of the two terminals when no external force is being imposed. When an electric overloading or high circuit temperature event occurs, the hot melt metal would be heated to melt and break, which would then make the free ends of the two terminals to be disconnected, and therefore, the circuit will be at "OFF" status.

6 Claims, 16 Drawing Sheets

TEMPERATURE FUSE PROTECTION DEVICE

BACKGROUND OF THE INVENTION

1. Field of the Invention

The present invention relates generally to a temperature fuse protection device which uses a hot melt metal for rivet coupling two separate terminals in a circuit for making the two terminals to be electrically-connected to the circuit, whereby the hot melt metal will break under heating and elevated temperature, and the circuit will become at the “OFF” status.

2. The Prior Arts

Electricity has become a must in modern society, which has surrounded all our lives. IT industry, homes, transportation, education, entertainment, etc, are all heavily dependent on electricity. Therefore, the safe usage of electricity has become more and more vital for people.

Generally speaking, the overall circuit is set with a main switch generally at the “ON” status in electric power plant. During an electrical overloading, short-circuiting, or high circuit temperature event, the fuse is melted or the circuit breaker is jumped to protect the safety of the electricity system.

In addition, there are several branch circuits in the overall circuit and have additional switches for controlling the respective circuits at the “ON” or “OFF” status. To strengthen the safety during operation, many switches also possess the capability of automatically jumping offline when an overloading or high circuit temperature event has occurred to prevent the risk of electrical fire due to the possible inability to react in time of the fuse or circuit breaker.

Besides the use of fuses, switches, or circuit breakers in overall circuits and the branch circuits mentioned above for circuit protection when overloading has occurred, some individual electrical products such as high-priced electronic products, data processing equipments, or electric heating appliances are provided with temperature sensing circuit breaker for circuit protection. For the above devices, when the overall circuit is overloaded or the circuit temperature is too high, the power will shut off by means of immediate temperature sensing such that the individual electric, electronic, product or equipment is protected and is saved from destruction, and thus could prevent overloading or high circuit temperature from occurring in the branch circuits to the extent that the other electric equipments are made unable to operate in the overall circuit.

A traditional temperature sensing circuit breaker installed on individual electronic products is of the following structure (shown in FIGS. 1 and 2): it has a contact spring 201, which is of a curved form, and will deform its shape to bend in an opposite direction from original and is thereby deflected when heated. One end of the contact spring 201 is an attachment assembly formed with a first terminal 202. And the other end of the contact spring 201 is a free end, and the free end assembly is formed with a first conduction point 203. An attachment assembly at a second terminal 204 is formed with a second conduction point 205, which is in correspondence with the first conduction point 203. When in use, the contact spring 201 bends towards the second terminal 204 to make the first conduction point 203 at the free end of the contact spring 201 to contact the second conduction point 205 of the second terminal so that the circuit is connected (shown in FIG. 1). When an electric overloading occurs, the contact spring 201 will deform its shape to bend in an opposite direction from original and is thereby deflected due to the high temperature, thus making the first conduction point 203 at the free end of the contact spring 201 to separate from the second conduction point 205, whereby resulting in the circuit being at an “OFF” status, as illustrated in FIG. 2, to be able to prevent the electric product from being destroyed. However, the traditional temperature sensing circuit breaker has several shortcomings as follows:

(a) During the fabrication of the contact spring 201, it is impossible to ensure that every contact spring 201 has the same thickness, degree of curvature, and structural characteristics; hence, the reaction temperature at which the contact spring 201 to bend in an opposite direction from original in a deflecting manner due to the high temperature is difficult to control, and the reaction temperature tolerance is substantially large.

(b) The acuity or degree of deformation of the contact spring when bending in the opposite direction in a deflecting manner as caused by the high temperature is relatively low, and cannot protect the electronic products in time from damage during an instantaneous electrical overloading event.

(c) The contact spring 201 does not always deform as desired to trigger the protection mechanism during an instantaneous electrical overloading event because it may not have bent/deflected fully or deflected in time, and has remained in a electrical conductive state with the terminals so that high circuit temperature leading to dangerous operating conditions for the individual electronic product and the entire circuit.

(d) When the overloading occurs, the contact spring 201 could bend or deflect partially to jump when it is hot and then to reconnect the circuit again when the contact spring temperature is lowered. The repeated turning “ON” and “OFF” is easy to cause sparks and thus dangers. Because of the repeated turning “ON” and “OFF” of the electrical power circuit, the electronic and electrical devices are to experience unstable electrical current, thus leading to device crashing or inability to operate normally, reduction of usage lifespan, and even possibly complete failure.

SUMMARY OF THE INVENTION

A primary objective of the present invention is to provide a temperature fuse protection device which overcomes the drawbacks of the traditional temperature sensing circuit breaker for individual electronic product that cannot set the reaction temperature value for the power cut-off accurately and effectively, and prevent the contact spring from bouncing back to connect the circuit again in various manner, thus leading to the unstable operation and lower lifespan of the electronic products, and as far as even complete destruction.

In accordance with an aspect of the present invention, there is provided a temperature fuse protection device which uses a hot melt metal to be riveted and connected onto two separated terminals of the circuit for making them electrically-connected. When no external force is imposed, the space between the two free ends of the two terminals remains to be a spacing. During an electric overload or high circuit temperature event, the hot melt metal will break, and the two free ends of the two terminals will thereby disconnect, and thus the circuit will be at “OFF” status. As a result, the electric usage safety is guaranteed.

Another objective of the present invention to use the characteristics of the hot melt metal for making certain to melt and break to make sure the circuit is completely at the “OFF” status without having to worry about the dangers of circuit temperature fluctuations or the contact spring from bouncing and deflecting back and forth contact to for connecting the circuit again and again. As a result, the electric usage safety is again guaranteed.

A further objective of the present invention is that the riveting method using a hot melt metal for connecting the two separated terminals of the circuit has the advantages of having a simpler structure, improved manufacturability, reduced volume, and cost efficiency.

BRIEF DESCRIPTION OF THE DRAWINGS

The present invention will be apparent to those skilled in the art by reading the following detailed description of a plurality of embodiments thereof, with reference to the attached drawings, in which.

DETAILED DESCRIPTION OF THE PREFERRED EMBODIMENTS

Figure 1:
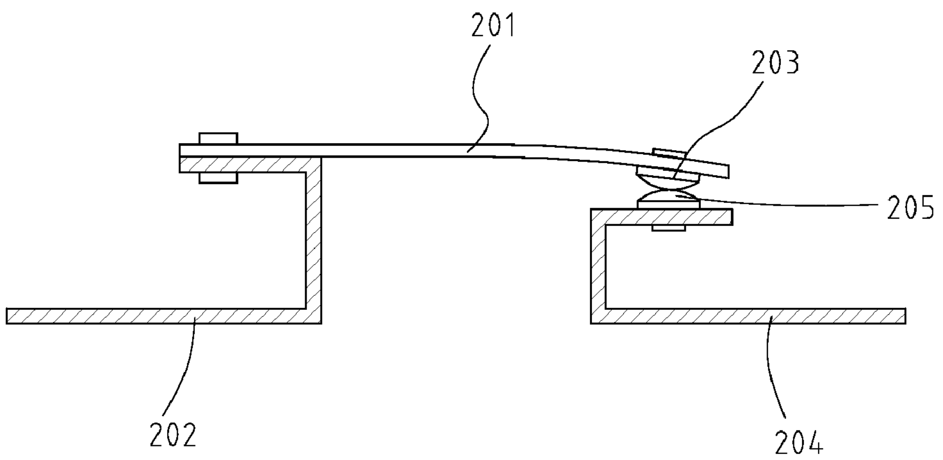
FIG. 1 (PRIOR ART)
FIG. 1 is an assembled cross-sectional view showing the "ON" status of a traditional circuit protection mechanism.
Figure 2:
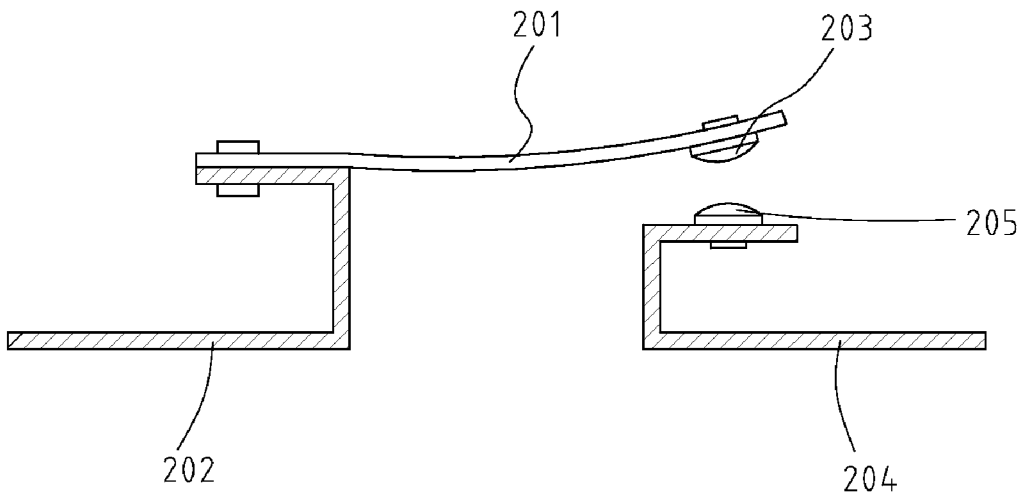
FIG. 2 (PRIOR ART)
FIG. 2 is an assembled cross-sectional view showing the "OFF" status of the traditional circuit protection mechanism.
Figure 3:
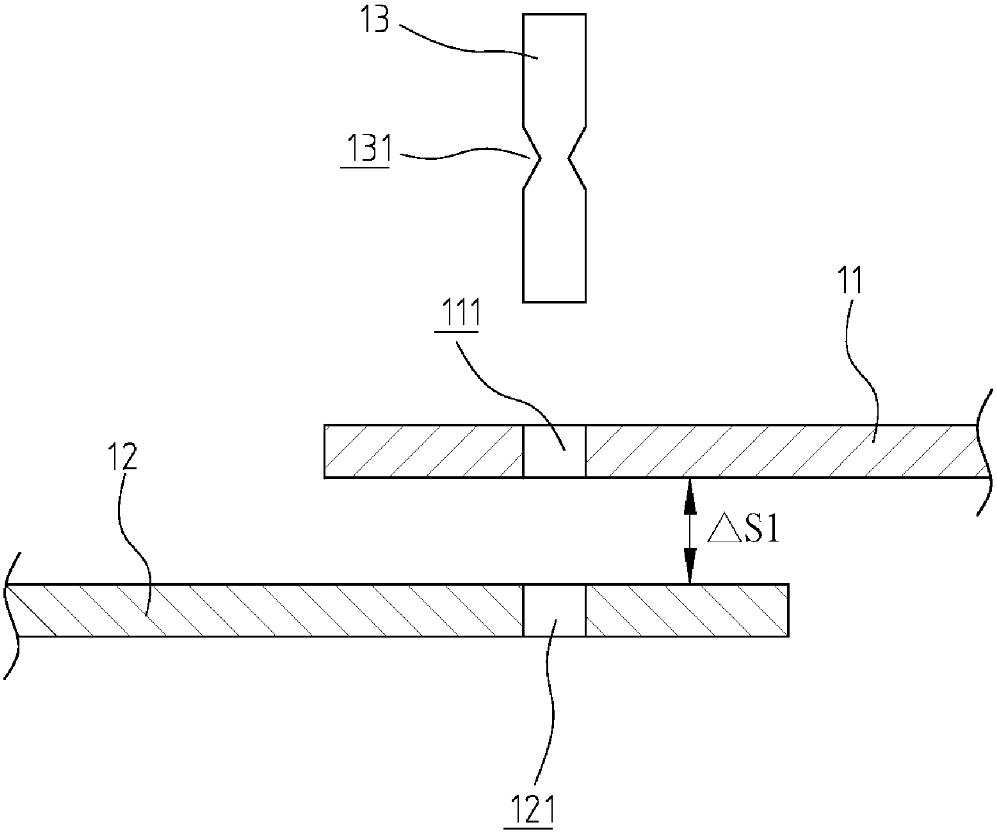
FIG. 3 is an exploded cross-sectional view showing a first embodiment of the present invention.
Figure 4:
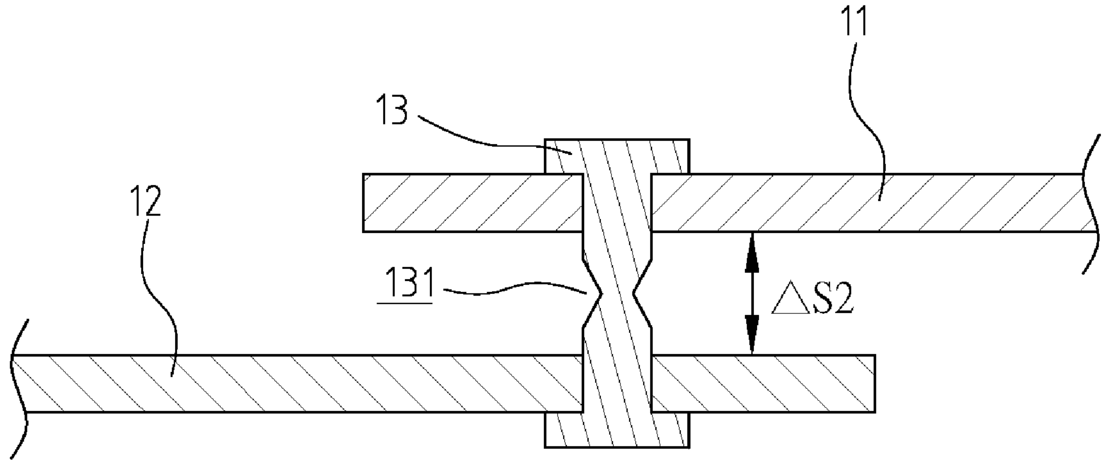
FIG. 4 is an assembled cross-sectional view showing the first embodiment in accordance with the present invention.
Figure 5:
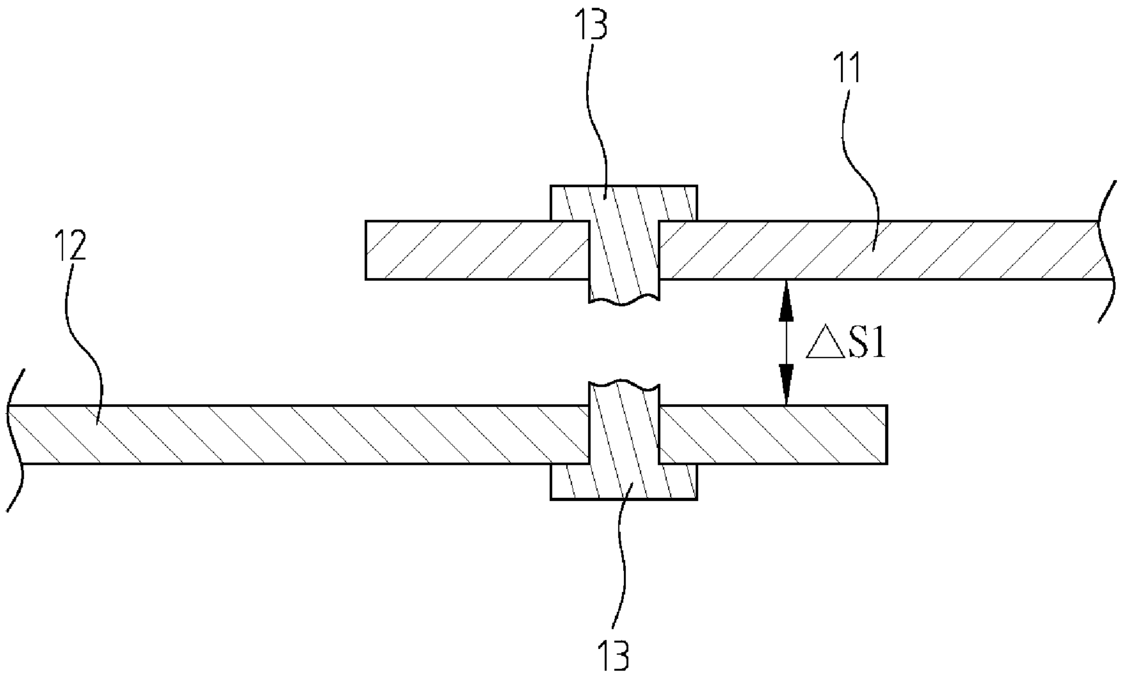
FIG. 5 is an assembled cross-sectional view showing the break of the hot melt metal during an electrical overload or high circuit temperature event, the separation of the free ends of the two terminals from each other, and the circuit at "OFF" status.

Referring to the drawings, FIGS. 3 and 4 are an exploded cross-sectional view and an assembled cross-sectional view showing a first embodiment constructed in accordance with the present invention, respectively; FIG. 5 is an assembled cross-sectional view which shows the breaking of the hot melt metal during an electrical or high circuit temperature event, the separation of the free ends of the two terminals from each other, and the circuit at "OFF" status. The temperature fuse protection device in accordance with the present invention comprises two terminals 11, 12 and a hot melt metal 13. An attachment assembly for the two terminals 11, 12 is established in a circuit and the free ends of the two terminals 11, 12 between which is kept at a spacing ΔS1 when no external force is imposed are formed with a through hole 111, 121 respectively to pass through. The through holes can be closed or open structures and at least one terminal of the two is made of elastic electric-conducted material to make it have the characteristic of resilience.

The hot melt metal is strip-shaped and possesses the characteristics of breaking when it is heated or at elevated temperature. The hot melt metal composition is changed according to the required hot melt metal breaking temperature. The middle section of the hot melt metal 13 could be formed with at least a loop-concave neck portion 131 with the cross-section of the loop-concave neck portion 131 smaller than the cross-section at the other sections.

When assembled, the hot melt metal 13 of proper length is passed through the through holes 111, 121 of the free ends of the two terminals 11, 12. And then by using the riveting method for impacting, both ends of the hot melt metal are to be enlarged. The hot melt metal then securely couples the free ends of the two terminals 11, 12, which are separate and not touching one another, to be electrically-connected. There is still a spacing ΔS2 between the free ends of the two terminals 11, 12, which is shorter than the spacing ΔS1 (shown in FIG. 4).

When an overloading or high circuit temperature event occurs, the hot melt metal 13 will be heated to reach a set temperature. Because the loop-concave neck portion 131 has the smallest cross-section and the highest temperature, it will melt and break first, which will make the two terminals 11, 12 disconnect and the circuit to be at "OFF" status (shown in FIG. 5).

Figure 6:
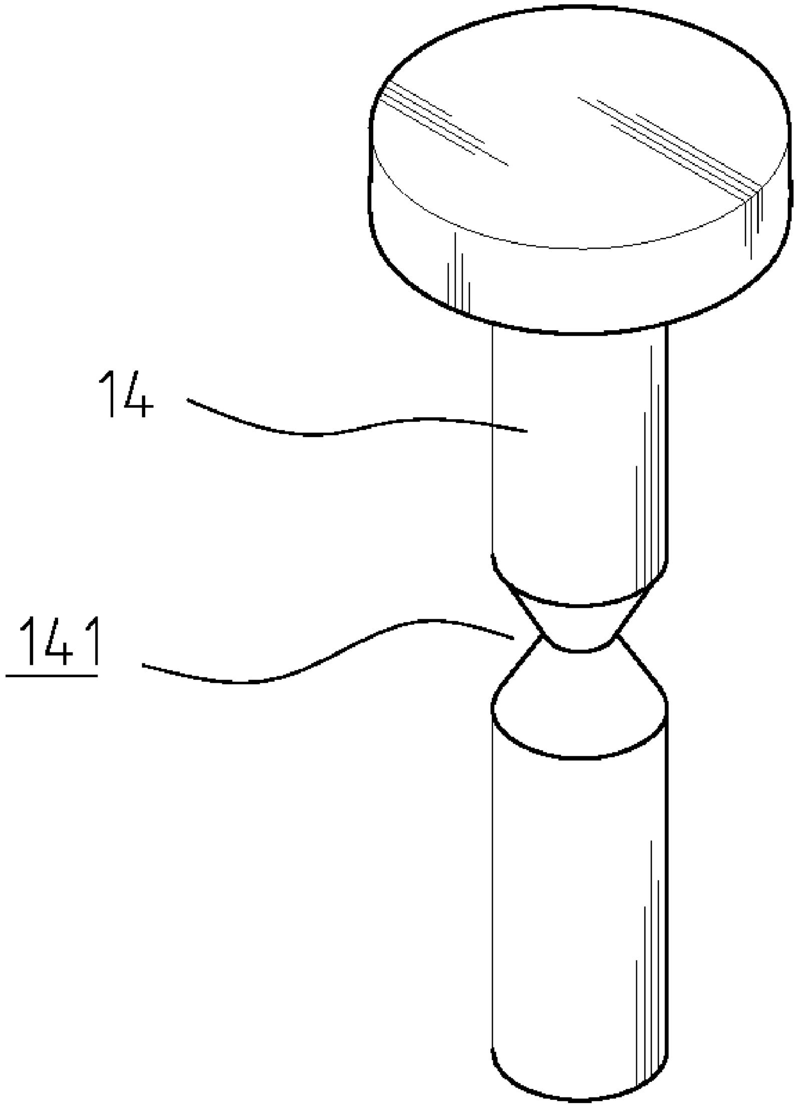
FIG. 6 is a perspective view showing another shape of the hot melt metal according to embodiment of the present invention.
Figure 7:
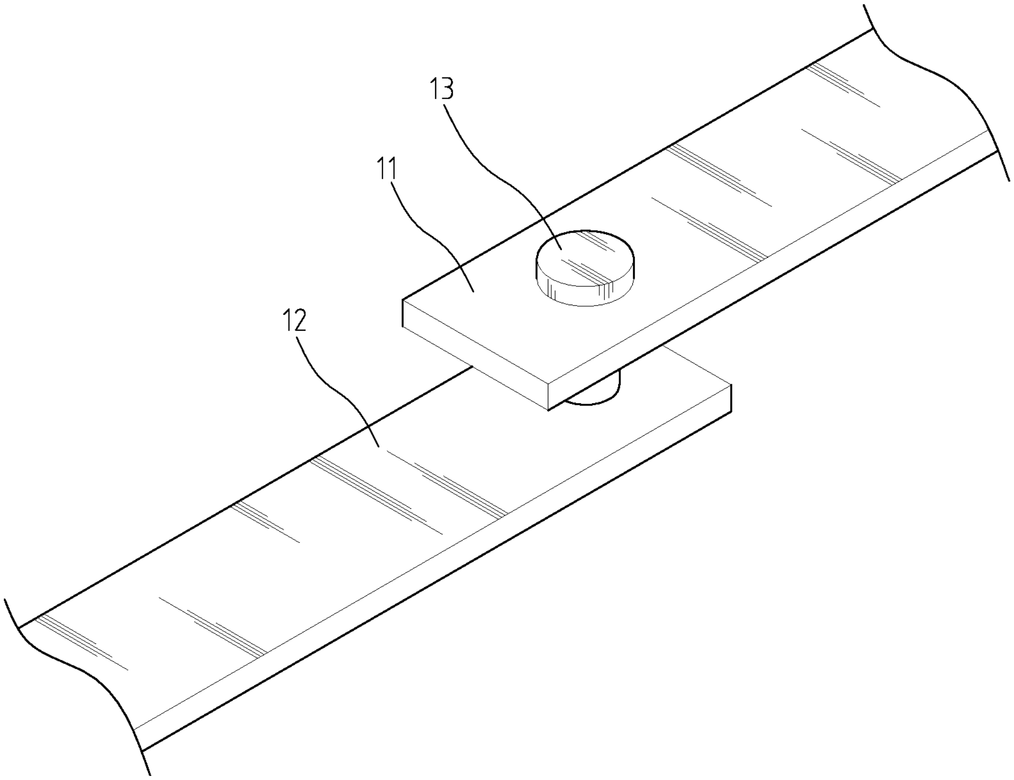
FIG. 7 is an assembled perspective view of the first embodiment in accordance with the present invention.

Referring to FIG. 6, FIG. 6 shows another shape of the hot melt metal 14 with one end having an enlarged cap shape, and the middle section formed with at least one loop-concave neck portion 141, which has the same effect as illustrated in FIG. 3.

Figure 8:
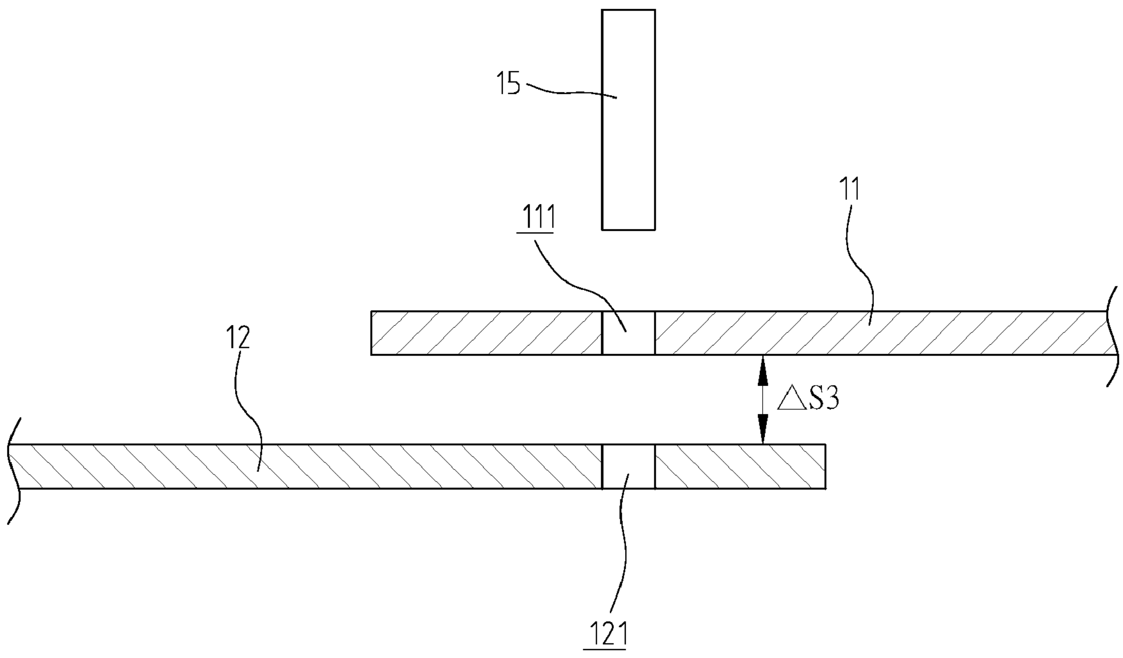
FIG. 8 is an exploded cross-sectional view showing a second embodiment of the present invention.
Figure 9:
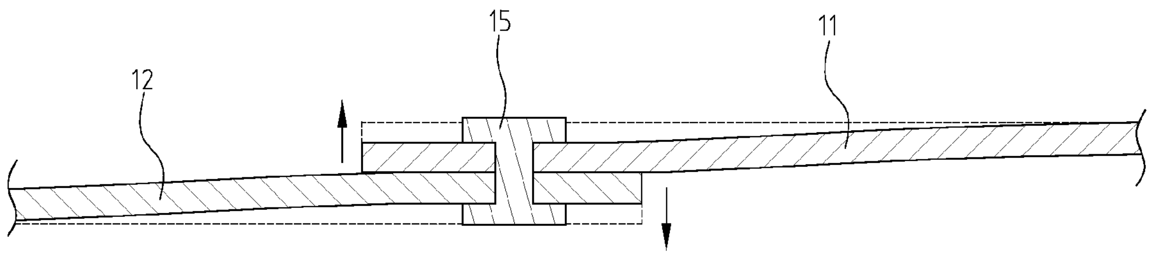
FIG. 9 is an assembled cross-sectional view showing the second embodiment of the present invention.
Figure 10:
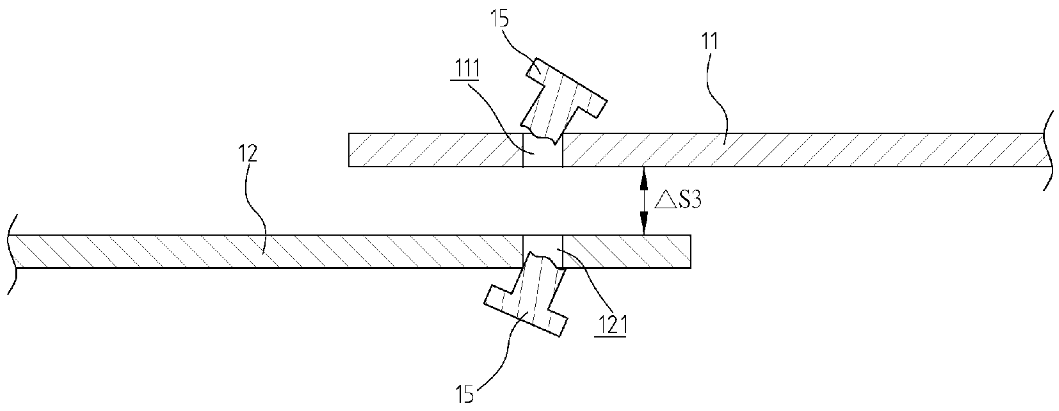
FIG. 10 is an assembled cross-sectional view showing the break of the hot melt metal during an electrical overload or high temperature event, the separation of the free ends of the two terminals from each other, and the circuit at "OFF" status.

FIGS. 8 and 9 are an exploded cross-sectional view and assembled cross-sectional view, respectively, showing a second embodiment of the present invention; FIG. 10 is an assembled cross-sectional view which shows the breaking of the hot melt metal during an electrical overload or high circuit temperature event, the separation of the free ends of the two terminals from each other, and the circuit at "OFF" status. The main operating principle of this embodiment is similar to that of the first embodiment mentioned above.

The temperature fuse protection device comprises two terminals 11, 12, and a hot melt metal 15. The attachment assembly for the two terminals 11, 12 is established in the circuit, and between the free ends of the two terminals 11, 12 which is kept at a spacing ΔS3, when no external force is imposed, a through hole 111, 121, respectively, is formed to pass through. The through holes can be closed or open structures, and at least one of the two terminals is made of elastic electrical-conducting material to make it to possess the characteristic of resilience, or an elastic unit (not shown in the drawing) is mounted at one of the two terminals at least using the elasticity of the elastic unit for maintaining the separation elasticity between the free ends of the two terminals 11, 12.

The hot melt metal is strip-shaped, and possesses the characteristics of breaking when it is heated or at elevated temperature. The hot melt metal composition can be changed according to the required hot melt metal breaking temperature.

When assembled, the hot melt metal 15 of proper length is passed through the through holes 111, 121 of the free ends of the two terminals 11, 12. Later, riveting method is used for impacting both ends of the hot melt metal 15 to enlarge them, while the hot melt metal 15 is being held down, for making the free ends of the two terminals 11, 12, which are separated, to be electrically-connected. The free ends of the two terminals 11, 12 inwardly abut each other, and have the outwardly parting elasticity between them (shown in FIG. 9).

Figure 12:
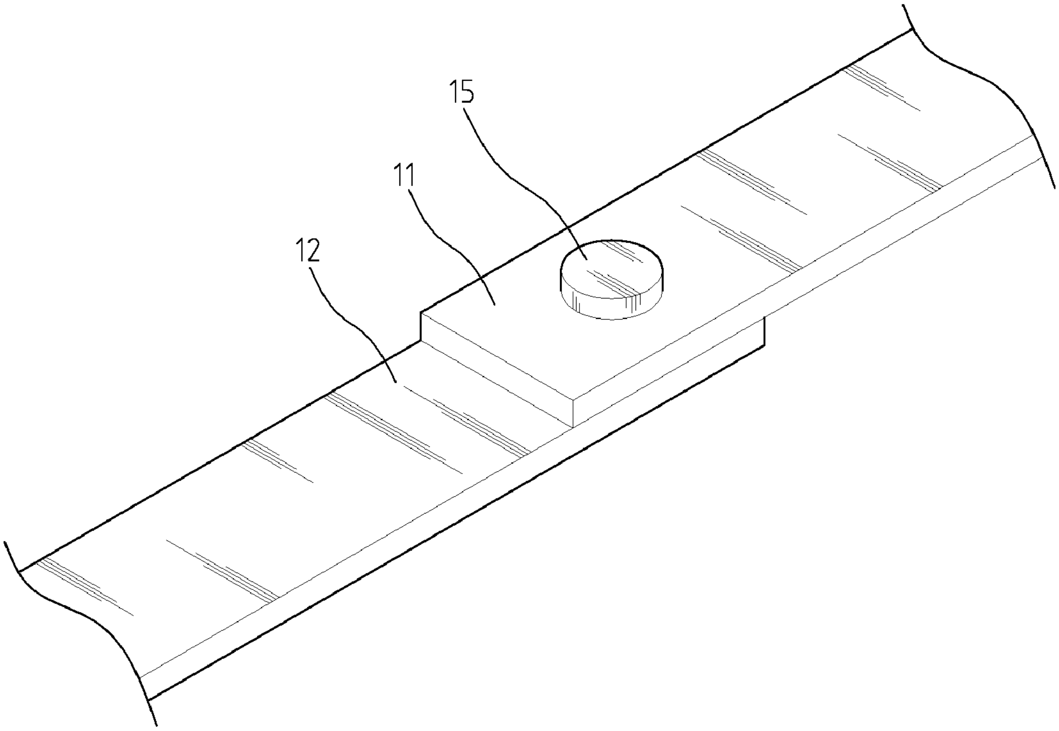
FIG. 12 is an assembled perspective view of the second embodiment in accordance with the present invention.

Referring to FIG. 12, FIG. 12 is an assembled perspective view of the second embodiment in accordance with the present invention.

Figure 11:
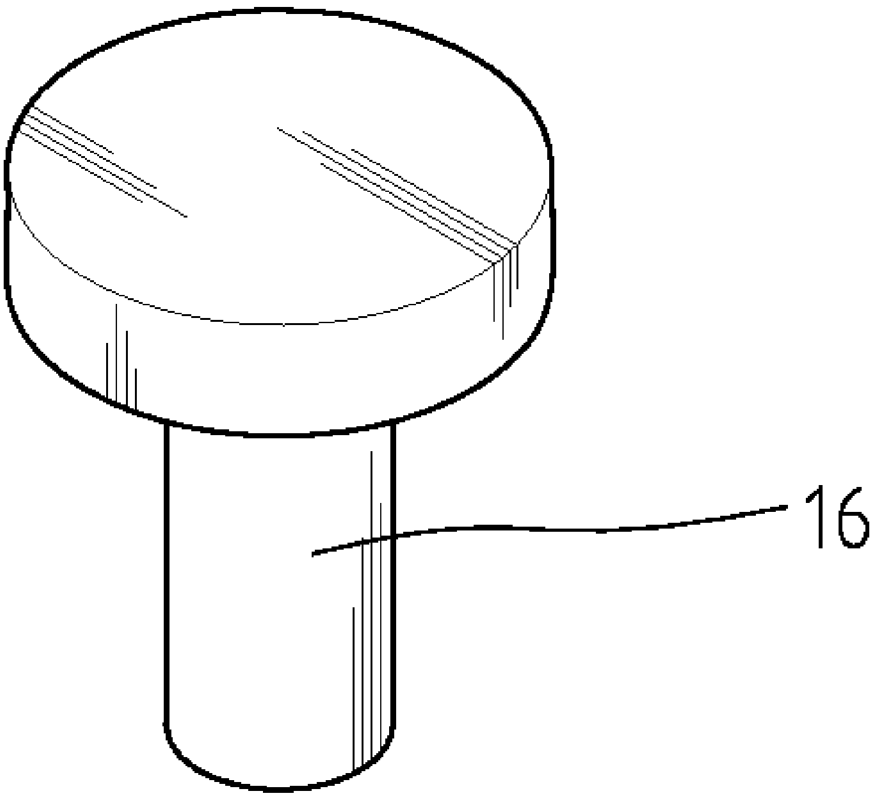
FIG. 11 is a perspective schematic view showing another shape of the hot melt metal of the second embodiment.

Referring to FIG. 11, FIG. 11 shows another shape of the hot melt metal 16 of the second embodiment, with one end having an enlarged cap shape, and the assembly mode is to the same as the hot melt metal 15 in FIG. 8.

When electric overloading or high circuit temperature occurs, the hot melt metal 15 will melt and break when reached at the set temperature. The free ends of the two terminals 11, 12 relinquish their riveting force given by the hot melt metal 15, and are separated from each other because of the opposing force due to elasticity, whereby they will be disconnected; and the circuit will be at "OFF" status (shown in FIG. 10).

Figure 13:
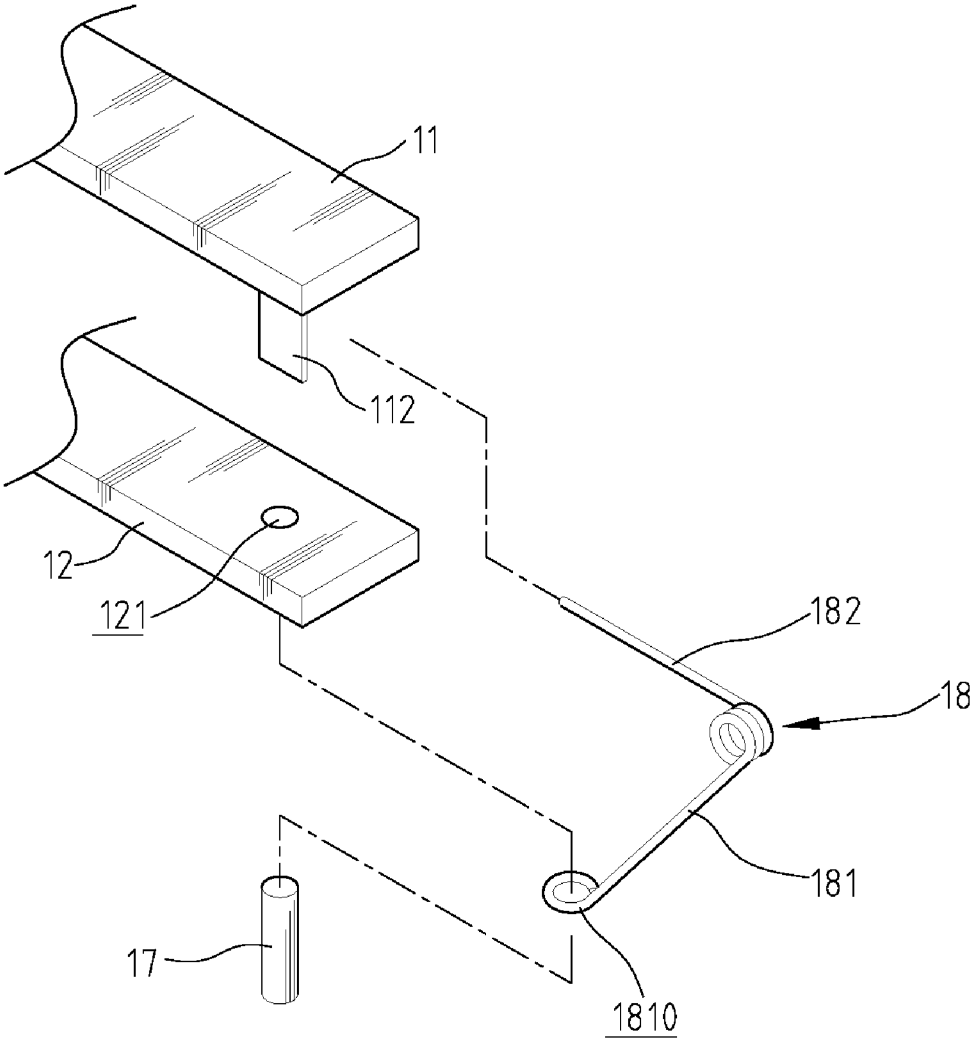
FIG. 13 is an exploded perspective view showing a third embodiment of the present invention.
Figure 14:
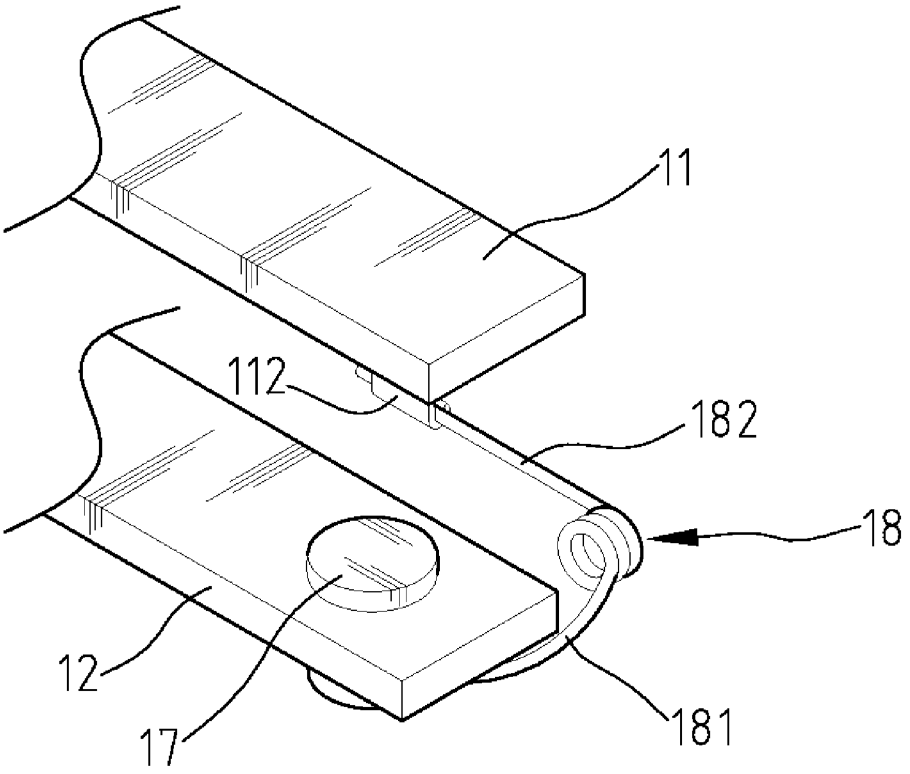
FIG. 14 is an assembled perspective view showing the third embodiment of the present invention.
Figure 15:
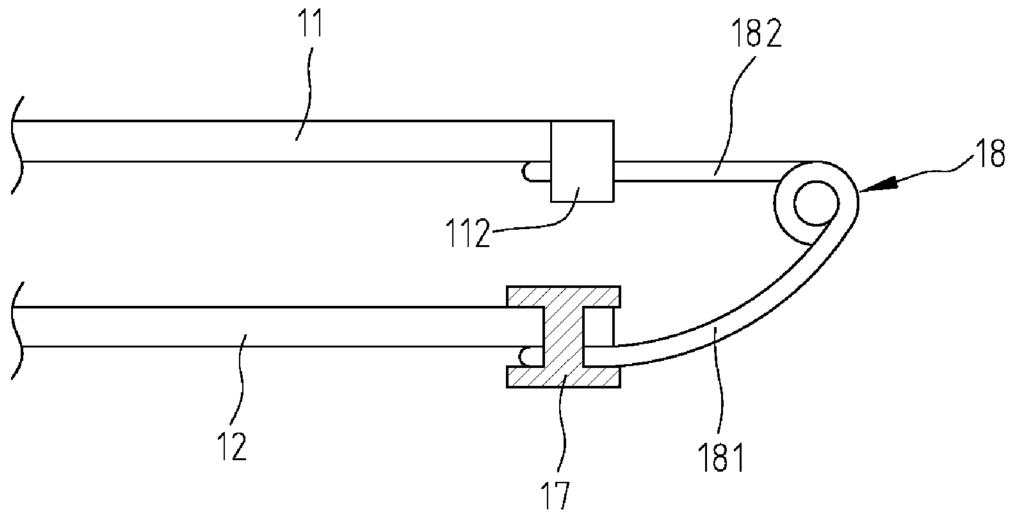
FIG. 15 is a assembled cross-sectional view showing the third embodiment of the present invention.
Figure 16:
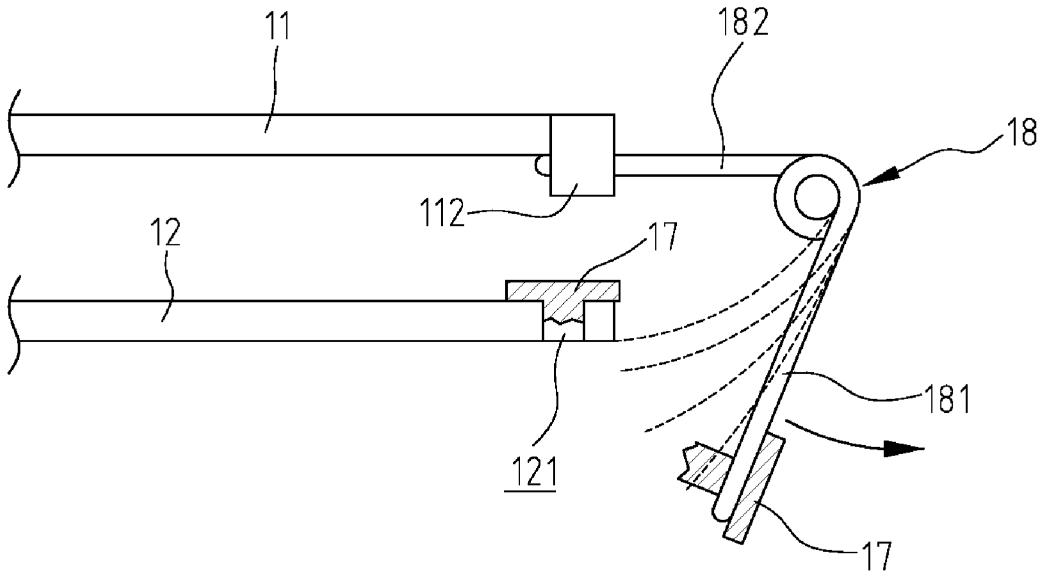
FIG. 16 is an assembled cross-sectional view showing the break of the hot melt metal during an electrical overload or high circuit temperature event, the separation of the free ends of the two terminals from each other, and the circuit at "OFF" status.

FIGS. 13-15 are an exploded perspective view, assembled perspective view, and assembled cross-sectional view, respectively, showing a third embodiment of the present invention; FIG. 16 is an assembled cross-sectional view showing the breaking of the hot melt metal during an electrical overload or high circuit temperature event, the separation of the free ends of the two terminals from each other, and the circuit at "OFF" status. The main operating principle of this embodiment is similar to that of the second embodiment.

The temperature fuse protection device in accordance with the third embodiment of the present invention comprises two terminals 11, 12, a hot melt metal 17, and an elastic connecting unit 18. The attachment assembly for the two terminals 11, 12 is established in a circuit, and at least one free end of the two terminals is formed with a through hole 121 to pass through. As for this embodiment, the through hole 121, which can be an open or closed structure, is disposed at the free end of the first terminal 12. The free end of the second terminal 11 is formed with an attachment piece 112, and between the two free ends of the two terminals 11, 12, a spacing ΔS4 is kept when no external force is imposed.

The hot melt metal 17 is strip-shaped, and has the characteristics of breaking when it is heated or at an elevated temperature. The hot melt metal 17 can have one end having an enlarged cap shape, and can change the composition according to requirements to allow for different hot melt metal breaking temperatures.

The elastic connecting unit 18, used for connecting the two terminals 11, 12 to make them electrically-connected. The elastic connecting unit 18 is made of a conducting material, and it comprises of two connecting bars 181, 182. At least one end of the two connecting bars is formed with an open hole to allow for passing through. As for this third embodiment, the open hole 1810 is disposed at the end of the first connecting bar 181. The second connecting bar 182 is strip-shaped.

When assembled, the hot melt metal 17 of proper length is passed through the open hole 1810 at the end of the first connecting bar 181 and the through hole 121 at the free end of the first terminal 12. And by using riveting method for impacting both ends of the hot melt metal 17, the two ends will be enlarged, and the free end of the first terminal 12 is connected with the first connecting bar 181 of the elastic connecting unit 18. In addition, the second connecting bar 182 of the elastic connecting unit 18 is pressed against the first connecting bar 181 for achieving tight fit. The attachment piece 112 at the free end of the second terminal 11 is used to connect the end of the second connecting bar 182 by wrapping around for achieving tight fit and coupling together. Both terminals 11, 12 are then electrically-connected, and the ends of both connecting bars 181, 182 of the elastic connecting units 18 abut upon each other to produce elastic outwardly force (shown in FIG. 16).

Referring to FIG. 15, when an overloading or high circuit temperature occurs, the hot melt metal 17 will melt and break when reached the set temperature. The first connecting bar 181 of the elastic connecting unit 18 loses the riveting force produced by the hot melt metal 17 and the two terminals 11, 12, and are separated from each other using the outwardly elastic force, whereby they will be disconnected, and making the circuit to be at "OFF" status (shown in FIG. 16).

On the basis of the above, the described embodiments of modular construction and dynamic relationships should have a variety of practical effects, as well as to be an unprecedented new design of efficacy and progress. It possesses elements consistent with the patent law.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A temperature fuse protection device, comprising:

two terminals, a hot melt metal, and an elastic connecting unit, wherein an attachment assembly for the two terminals is established in a circuit, and a spacing is maintained between free ends of the two terminals when no external force is imposed, and a through hole is formed in at least one free end of the two terminals for allowing the hot melt metal to pass through, and wherein the hot melt metal is strip-shaped, and having the characteristics of breaking when heated or under elevated temperature, and wherein the elastic connecting unit, comprising two connecting bars, is connecting the two terminals and making them electrically-connected, and at least one end of the two connecting bars formed with an open hole for passing through, and wherein when assembled, the hot melt metal of proper length is put through the open hole at the end of a first connecting bar of the two connecting bars and the through hole in the free end of a first terminal of the two terminals, and using a riveting method for impacting the hot melt metal, the two ends of the hot melt metal are enlarged, and are connecting a free end of a first terminal with a first connecting bar of a elastic connecting unit, and pressing a second connecting bar of the two connecting bars of the elastic connecting unit against the first connecting bar for achieving a tight fit and coupling together, both terminals forming an electrical connection, and the ends of both connecting bars of the elastic connecting unit abut upon each other to produce elasticity outward, wherein when no external force is imposed, each of the free ends of the two terminals are vertically overlapped with one another and separated by the spacing without touching each other.

2. The temperature fuse protection device as claimed in claim 1, wherein the free end of a second terminal of the two terminals is formed with an attachment piece, the second connecting bar of the elastic connecting unit is strip-shaped, and the second connecting bar of the elastic connecting unit is pressed against the first connecting bar for achieving a tight fit, and the attachment piece of the second terminal is wrapped around and secured to the end of the second connecting bar.

3. The temperature fuse protection device as claimed in claim 1, wherein the through hole of the first terminal of the two terminals has a closed structure.

4. The temperature fuse protection device as claimed in claim 1, wherein the through hole of the first terminal of the two terminals has an open structure.

5. The temperature fuse protection device as claimed in claim 1, wherein the hot melt metal composition is changed according to the required hot melt metal breaking temperature.

6. The temperature fuse protection device as claimed in claim 1, /wherein the elastic connecting unit is made of electrically-conducting material.

* * * * *